United States Patent
Jen

(10) Patent No.: US 6,184,423 B1
(45) Date of Patent: Feb. 6, 2001

(54) METHOD TO ELIMINATE FORMIC ACID AND ACETIC ACID FROM PROCESS WATER IN ETHYLENE GLYCOL PLANT

(75) Inventor: Zo-Chun Jen, Taipei (TW)

(73) Assignee: Nanya Plastics Corporation, Taipei (TW)

(*) Notice: Under 35 U.S.C. 154(b), the term of this patent shall be extended for 0 days.

(21) Appl. No.: 09/140,891

(22) Filed: Aug. 27, 1998

(51) Int. Cl.$^7$ .................................................. C07C 29/74

(52) U.S. Cl. ........................................... 568/854; 568/872

(58) Field of Search ..................................... 568/854, 872

(56) References Cited

U.S. PATENT DOCUMENTS 2,409,441 * 10/1946 Metzger et al. ..................... 260/635

* cited by examiner

Primary Examiner—Laura L. Stockton
(74) Attorney, Agent, or Firm—Bacon & Thomas

(57) ABSTRACT

The present invention provides and relative equipment to eliminate formic acid and acetic acid from process water in ethylene glycol plant. First, we use weakly basic anion resin to absorb the weakly acidic ions of formic acid and acetic acid. The rest free ions then will be absorbed by strongly basic anion resin. In this invention, we use vertical strataed bed or horizontal series bed as the treating unit, which are packed with weakly basic and strongly basic anion resins. This can increase the efficiency of eliminating formic acid and acetic acid from process water, save cost, and reduce the amount of wastewater.

3 Claims, 2 Drawing Sheets

METHOD TO ELIMINATE FORMIC ACID AND ACETIC ACID FROM PROCESS WATER IN ETHYLENE GLYCOL PLANT

FIELD OF THE INVENTION

This invention relates to a method and a relative equipment for eliminating formic acid and acetic acid from process water in ethylene glycol plant. In ethylene glycol process, if formic acid and acetic acid in the process water are not eliminated well before it is recycled, this will reduce ethylene glycol yield and cause corrosion problems to equipment and pipes.

BACKGROUND OF THE INVENTION

We are familiar with the reversible reaction between weakly basic anion resin with strongly acidic ions. The reaction equations are as follows:

Absorption:

$2R—N + 2H^+ + SO_4^{-2} \rightarrow (R—NH)_2SO_4$ $R—N + H^+ + Cl^- \rightarrow R—NH \cdot Cl^-$ Regeneration:

$(R—NH)_2SO_4 + 2OH^- \rightarrow 2R—N + SO_4^{-2} + 2H_2O$ $R—NH \cdot Cl^- + OH^- \rightarrow R—N + Cl^- + H_2O$ According to these equations, we know that the main function of weakly basic anion resin is to absorb strongly ionic acids, such as $H_2SO_4$, HCl, $HNO_3$, etc. But for weak acid (for example, formic acid and acetic acid), the absorption become worse. If the water contain both strong acid and weak acid at the same time, the weakly basic anion resin will absorb strong acid firstly, then weakly acid. This method has some problems: The theory formic acid absorption capability for the general resin provided by vendor is considered with 80% efficiency. Because the real plant can not follow pH and absorption curve to treat the process water, the target value can not be made.

A real plant has a column with 6000-liter weakly basic anion resin to treat process water whose formic acid concentration is 25 ppm. From periodic water adoption, we know that:

(1.) The theory formic acid absorption capability for weakly basic anion resin 46 g(formic acid equivalent gram)×1.25eq/L(resin absorption capability)=57.5g/L (2.) If the efficiency is considered as 80% for the theory formic acid absorption capability of weakly basic anion resin, we can get the theory periodic water adoption as follow.

57.5 g/L×80%×6000L/R÷25 ppm=11040 m³/cycle (3.) After implementing an examination for the formic acid absorption capability, we get the periodic water adoption as follow.

14.3 g/L×6000 L/R÷25 ppm=3432 m³/cycle (4.) Theory vs. exam.

3432 m³/cycle÷11040 m³/cycle×100%=31%

(5.) From the data described above. If we do not follow pH and absorption curve to treat the process water, the product rate is merely 31%.

Note:

Theory Formic Acid Absorption Capacity:

Formic acid equivalent gram multiply acid absorption equivalent gram per liter resin (refer to the character of resin), represent as g/L.

Actual Formic Acid Absorption Capacity:

Amount of water adoption×ion concentration÷amount of resin÷1000, represented as g/L The efficiency of Actual acid elimination:

Actual Formic Acid Absorption capacity through examination÷Theory Formic Acid Absorption capacity×100% represented as %.

The concentration of formic acid is direct relative to pH value, and pH value will influence absorption capacity of weakly basic anion resin. Because of ion absorbability reducing, formic acid will be leaked before reaching resin fully saturated condition, and elimination rate will be influenced. Using weakly basic anion resin to treat weak acid, the elimination will not complete and it will be disadvantaged to recover wastewater.

This invention tries to treat some weak acid such as fornic acid and acetic acid. In ethylene glycol process, if formic acid and acetic acid in the process water did not eliminate well and we reuse this recovery water, this will reduce ethylene glycol product rate and cause corrosion problems to equipment and pipes. Therefore it is important to eliminate acid well and provide good quality recovery water.

In ethylene glycol (EG) process, organic acids (formic acid and acetic acid) comes from the side reaction of ethylene oxide (EO) reaction. EO and EG reaction mechanism are described as follows:

1. Main reaction: $C_2H_4 + \frac{1}{2}O_2 \rightarrow C_2H_4O$ (EO)
2. Side reaction:

$C_2H_4 + 3O_2 \rightarrow 2CO_2 + 2H_2O$ $C_2H_4 + O_2 \rightarrow 2HCHO$ (Formaldehyde)

$HCHO + \frac{1}{2}O_2 \rightarrow HCOOH$ (Formic Acid)

$C_2H_4O \xleftarrow{\text{isomerization}}\rightarrow$ (EO)

$CH_3CHO + 1/2O_2 \longrightarrow CH_3COOH$ (Acetaldehyde)     (Acetic Acid)

3. Esterification—Reaction of Formic or Acetic Acid with Ethylene Glycol $HOCH_2CH_2OH + HCOOH \longrightarrow HOCH_2CH_2OOCH + H_2O$ Ethylene Glycol   Formic Acid     Ethylene Glycol Monoformate $HOCH_2CH_2OH + CH_3COOH \longrightarrow$ Ethylene Glycol   Acetic Acid $HOCH_2CH_2OOCCH_3 + H_2O$ Ethylene Glycol Monoacetate $HOCH_2CH_2OOCH + HCOOH \longrightarrow$ Ethylene Glycol    Formic Acid
Monoformate $HCOOCH_2CH_2OOCCH_3 + H_2O$ Ethylene Glycol Diformate $HOCH_2CH_2OOCCH_3 + CH_3COOH \longrightarrow$ Ethylene Glycol    Acetic Acid
Monoacetate $CH_3COOCH_2CH_2OOCCH_3 + H_2O$ Ethylene Glycol Diacetate -continued

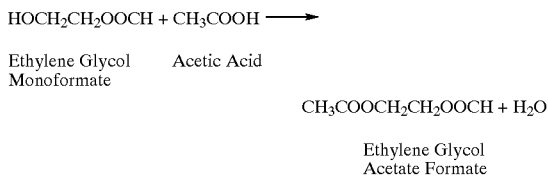

In ethylene glycol process, we use circulation water to scrub ethylene oxide, also formic acid and acetic acid at the same time. Ethylene oxide reacts with water and then produces ethylene glycol. If water contain formic acid and acetic acid, it will esterificate with ethylene glycol and cause corrosion problems to equipment and pipes. Therefore formic acid and acetic acid must be eliminated.

SUMMARY OF THE INVENTION

It is therefore an object of the present invention to provide a method and a relative equipment for eliminating formic acid and acetic acid from process water in ethylene glycol plant. In the prevent invention, the method uses weakly basic anion resin to absorb the weakly acidic ions of formic acid and acetic acid. The rest free ions then is absorbed by strongly basic anion resin. This can increase the elimination efficiency.

BRIEF DESCRIPTION OF THE DRAWING

Figure reference

Figure 1A:
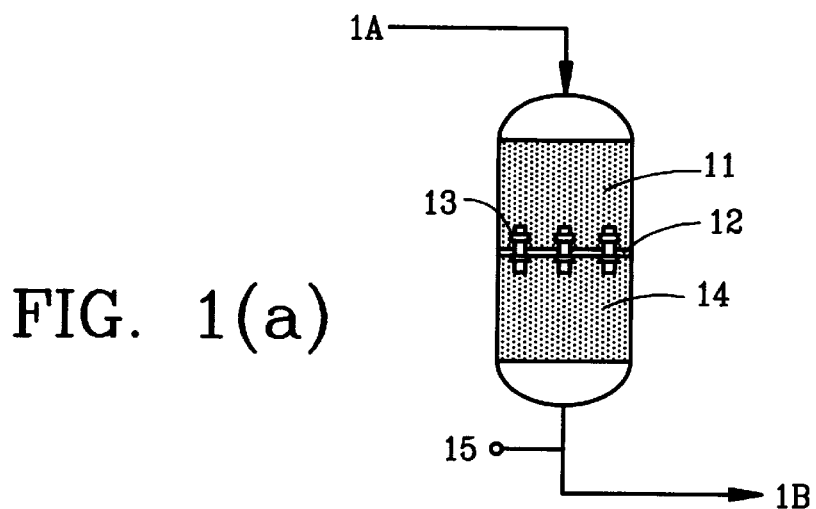
FIG. 1(a) strated bed resin treating device

Symbol summary:

FIG. 1(a)

(11) weakly basic anion resin
(12) baffle
(13) adapter
(14) strongly basic anion resin
(15) conductivity metter
(1A) process water inlet
(1B) process water outlet

FIG. 1(b), (c)

(1) weakly basic anion resin
(2) baffle
(3) adaptor
(4) strongly basic anion resin
(A) process water inlet
(B) process water outlet
(B') regeneration medicine inlet
(C') regeneration waste outlet FIG. 3. de-acid efficiencies of different treating methods

DETAILED DESCRIPTION OF THE INVENTION

The primary purpose of this invention is to provide a method and a relative equipment for eliminating formic acid and acetic acid from process water in ethylene glycol plant.

The method of this invention first adopt weakly basic anion resin to adsorb formic acid and acetic acid, then using strogly basic anion resin to exchange the residual of formic acid and acetic acid. This method can increase the efficiency of eliminating formic acid and acetic acid.

The inventor discover formic acid and acetic acid previously only are removed by weakly basic anion resin, but the adsorb efficiency is low, moreover the frequency of regeneration is increase and large amount of waste water being produced. So above mentioned method isn't suitable; The combination used both weakly basic anion resin and strongly basic anion resin in a column form a strated-bed disposal equipment, which remove acid efficiency is higher than just used weakly basic anion resin. The promotion of efficiency is 69% (by the average value of practicle example),which reduce cost largely and correspond with economic benefit.

On this invention, the equipment of adsorb-exchanging formic acid and acetic acid include two kinds listed as below.

(1) Strated-bed disposal device (the invention that remove weak acid orderly by weakly basic anion resin and strong basic anion resins is called strated-bed treat method), whose advantages are that the occupied space is small, economize material of tube, simple operation and lower fixed cost, is vertical showed on FIG. 1.

(2) Serial disposal device (weakly basic anion and strongly basic anion resin are installed in different column respectively), whose device occupy space is large, operation has two parts and invested expense is more expensive, is combined to horizontal device showed on FIG. 2. by weakly basic anion and strongly basic anion resin.

Above mentioned strated-bed and serial disposal device during regeneration, must regenerate back section strongly basic anion resin first, then regenerate front section weakly basic anion resin by the residual of regenerate liquid; During feeding water, water flow along weakly basic anion resin to strongly basic anion resin.

The resin being suitable on this invention is following:

The weakly basic anion resin: Amberlyst A21,Duolite A368S.

Dowex MWA1,Diaion WA30

The strongly basic anion resin: Amberlite IRA910.Cl, Duolite A162,

Dowex MSA2,Diaion PA412

The adsorb ability of combination Amberlyst A21 is adopted as weakly basic anion resin and Amberlite IRA 910.CI is adopted as strongly basic anion resin is the best.

The volume ratio of weakly basic anion resin and strongly basic anion resin installed is suitable for 10:90~90:10, furthermore 70:30 is the best. The reaction of formic acid and acetic acid adsorbed by weakly basic anion resin and the regeneration reaction are following:

The adsorption reaction:

R—N+H$^+$+HCOO$^{--}$→R N HCOOH

R—N+H$^+$+CH$_3$COO$^{--}$→R—N CH$_3$COOH

The regeneration reaction:

R—N HCOOH+OH$^{--}$→R—N+NCOO$^{--}$+H$_2$O

R—N CH$_3$COOH+OH$^{--}$→R—N+CH$_3$COO$^{--}$+H$_2$O

As for formic acid and acetic acid are adsorbed and regenerated by strongly basic anion resin, its reaction is following:

Adsorption reaction:

R—N OH+HCOO$^{--}$→R—N HCOO+OH

R—N OH+CH$_3$COO$^{--}$→R—N CH$_3$COO+OH

Regeneration reaction:

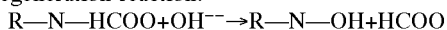
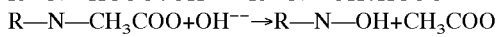

Above mentioned describing, formic acid and acetic acid can be removed effectively with weakly basic anion resin and strongly basic anion resin to adsorb and regenerate rderly.

The explaining of Figure:

FIG. 1(a) is an example of this invention's strated-bed disposal equipment; the strated-bed disposal equipment lay weakly basic anion resin (11) on the upper layer, baffle (12) with water collector (13) on the intermediary and strongly basic anion resin (14) on the lower layer. Two kinds of resins installed in the same column Process water flow along top (1A) to bottom. Feeding water end point is decided by failure of conductive meter (15) of strongly basic anion resin layer exit. Moreover, when the slope of the conductivity come up and pH value reduce gradually, the point is to discharge the disposed process water (1B).

Figure 1B:
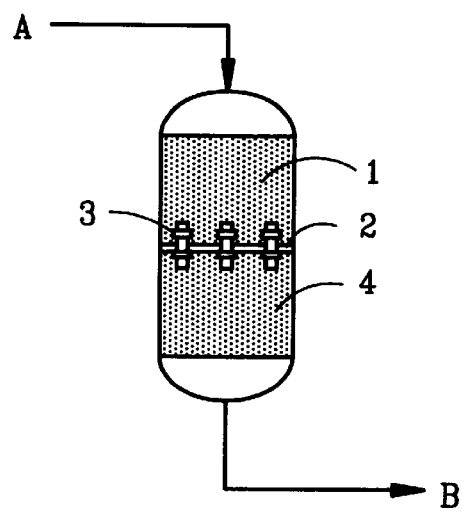
FIG. 1(b) adsorption reaction illustration figure of strated bed resin treating device.

FIG. 1(b) express the strated-bed disposal equipment adopted on this invention how to adsorb. Install ion-exchanging resin in column, weakly basic anion resin (1) is on upper layer, baffle (2) and water adopter (3) used to separate on middle and strongly basic anion resin (4) on lower layer respectively. Process water (A) flow down from top to bottom through weakly basic anion resin (1) strongly basic anion resin (4) in order to adsorb formic acid and acetic acid in water, so get no-acid process water (B).

Figure 1C:
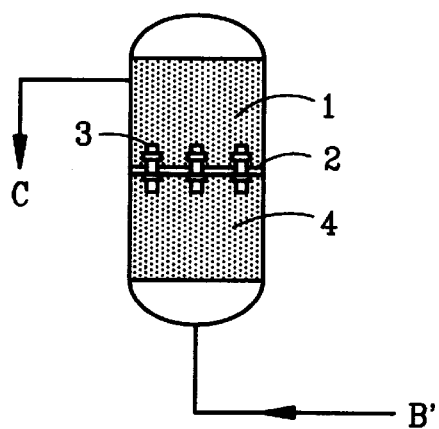
FIG. 1(c) regeneration reaction illustration figure of strated bed resin treating device.

FIG. 1(C) express the strated-bed disposal equipment adopted on this invention how to regenerate. The 4% NaOH regenerate liquid (B) flow up from bottom to top through strongly basic anion resin (4) and weakly basic anion resin (1) having adsorbed saturate formic acid and acetic acid in order to proceed ion-exchanging reaction, then discharge the regenerate liquid with formic acid and acetic acid from column (C).

Figure 2A:
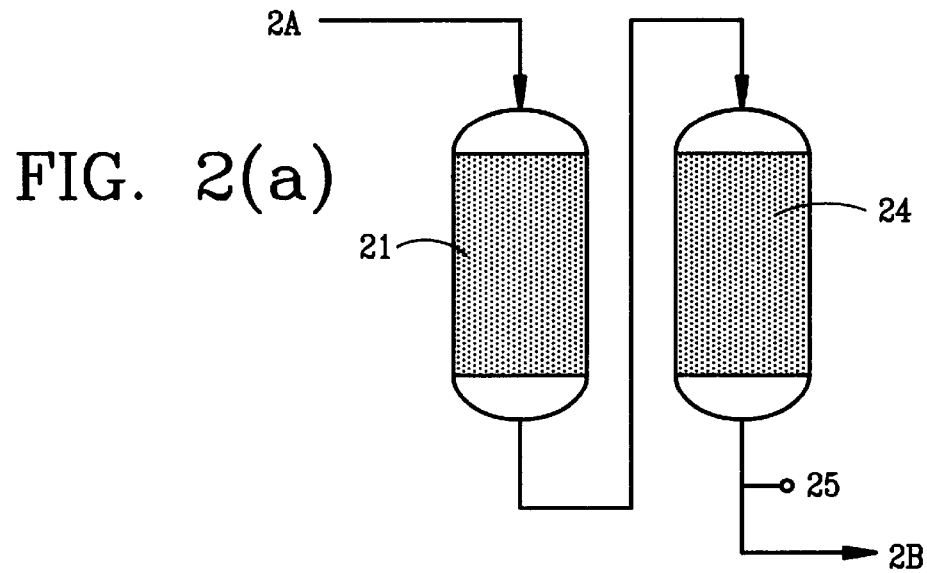
FIG. 2(a) series resin treating device.

FIG. 2(a) is an example of this invention's serial-bed disposal equipment. This equipment install weakly basic anion resin (21) and strongly basic anion resin (24) in different column to form a serial combination. Process water with formic acid and acetic acid flow through weakly basic anion resin (11) and strongly basic anion resin (24) orderly, moreover feeding water end point is decided by failure of conductivity meter (25) of strongly basic anion resin layer exit.

Figure 2B:
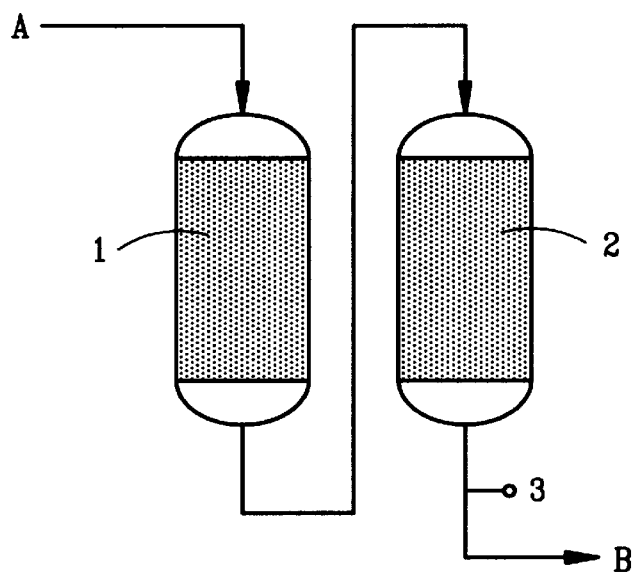
FIG. 2(b) adsorption reaction illustration figure of series bed resin treating device.

FIG. 2(b) express the serial-bed disposal equipment adopted on this invention how to adsorb:

The serial equipment fill weakly basic anion resin (1), strongly basic anion resin (2) in different column respectively. Process water (A) with formic acid and acetic acid pass through regenerated weakly basic anion resin (1) and strongly basic anion resin (2) in order to adsorb formic acid, acetic acid, then get no-acid process water (B).

Figure 2C:
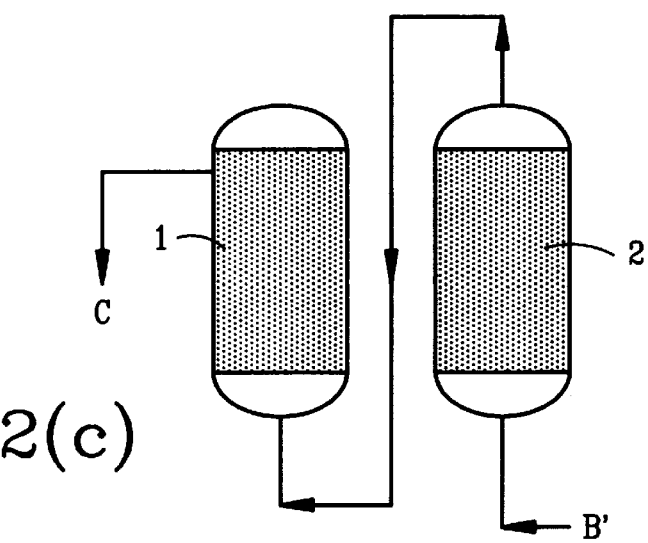
FIG. 2(c) regeneration reaction illustration figure of series bed resin treating device.

FIG. 2(C) expess the serial-bed disposal equipment adopted on this invention how to regenerate:

The 4% NaOH regenerate liquid (B) pass through strongly basic anion resin (2) and weakly basic anion resin (1) which have adsorbed saturate formic acid and acetic acid orderly to proceed ion-exchanging reaction, then discharge the regenerate liquid with formic acid and acetic acid from column (C).The require amount of weakly basic anion resin and strongly basic anion resin of both strated-bed and serial-bed disposal equipment and the size of water adopter don't specify depending on conductive, pH and amount of process with formic acid and acetic acid. The conductivity of disposed process water is trifling, so the unit use micromhos practically.

The disposal way of this invention is carried out by the conductivity, pH value of failure, theory excharge capacity, actual exchange capacity, actual efficiency of removing acid.

A. Conductivity: Conductivity is used to test the conductive ability of water. It's value is reverse of the resistance value which electric pass through an 1 $cm^2$ area and 1 cm length of liquid pillar. The unit is /cm or mho/cm. When conductivity is small, the unit use $\mu\Omega$/cm. If this test of item fail, use direct test conductive meter to test.

B. pH meter: pH meter measure the hydrogen ion concentration of water, the value express by index of concentration, which is called pH. The tested method of pH meter is used potentiometry to test. To take potentiometry into water, the cell of potentiometry will produce voltage, then transfer to current. The current show a ratio with the pH of water. pH value is transferred into digital to show up or is indicated with indicator. This item is tested by direct test pH meter (DKK-pH L20).

C. Theory exchange capacity: The exchange capacity of resin produced after leaving the factory is provided to customer by factory. The exchange capacity express as eq/L or g/L.

The actual adsorb capacity=amount of feeding water× concentration of ion÷amount of resin÷1000

D. Actual exchange capacity: The actual exchange capacity of resin on field. The actual exchange capacity is affected by field condition, condition of water; Actual exchange capacity is less than theory exchange capacity commonly. The unit of actual capacity is also used eq/L or g/L.

E. The actual efficiency of removing acid: The ratio of actual exchange capacity and theory exchange capacity×100%.

The required test items and methods for efficiency of remove formic acid and acetic acid that formed from side reaction in Ethylene Glycol process are describe as follow:

(1). pH test: pH meter be used in this test method.
   A. Apparatus:
      1. pH meter(DKK-pH L20)
      2. Instrument operation and proofread guide.
      3. Beaker(including different size for samples pH test)
      4. Magnetic stirrer, magnetic stirring bar.
      5. Mercury thermometer (used on compensate of electrode or temperature adjust)
   B. Reagent:
      1. pH 6.86 standard solution (zero point), pH 4.01 standard solution (sample pH<7), pH 9.18 standard solution (sample pH>7), using these standard Solution when proofread.
      2. Saturated KCL electrode solution.

(2). Conductivity test: conductivity meter be used in this test method (unit express by $\mu\Omega$/cm)
   Apparatus
      1. Conductivity meter (DKK AOL-10)
      2.Instrument operation and proofread guide.
      3. Beaker(including different size for sample conductivity test
   A. Conductivity standard solution
      1. 1210 micrornhos/cm
      2. Record standard value direct by standard conductivity solution .
   Conductivity solution operation note
      1. Depend on standard solution (1210 micromhos/cm), it is necessary to proofread instrument when deviation higher than 10%.
      2. Standard solution exposed to the air must be avoid. Because it is affected with ammonia gas and acid.

1. Adjust temperature of standard solution to 25±5° C.
4. Rinse conductivity cell with Mill-Q H$_2$O several times Clear with standard solution before rinse.
5. Immerse cell into standard solution and record the data after stable (unit: micromhos/cm 25° C.)
6. To complete proofread procedure when deviation lower then 10% or adjust cell constant until conductivity reach standard value.
7. Conductivity meter operation note:
   a. Rinse Dip cell before use, especial low conductivity matter (ex:Mill QH$_2$O)
   b. Dip cell must be immerse into solution wholly, full electrode room with solution, be sure air bubble not exist. Slope cell and pat when drive out air bubble then put cell on center of solution plumb.
   c. Never touch solution vessel to maintain test accurate.
   d. Improve the precision by swing test solution along probe when determine low conductivity solution.
   e. Turn off related electrical equipment to avoid test error if necessary.(ex: stirrer motor, magnetic bar electric motor or other electrical equipment)
   f. Cell move to another solution is forbidden when Mill-QH$_2$O or new sample be used before clear.
   g. Cell and temperature probe must be clear absolute.
   h. Check cell and temperature probe whether or not they are abrade crack or dirty.
   i. Cell must be immerse in Mill-Q H$_2$O, never put it on water every test interval.

(3). Preparation of reagent:

A. Regenerate the resin 950 mL) with the 50 g/L of NaOH. Require 2.5 grams of NaOH that concentration above 99.95% (equal 62.5 grams of 4% NaOH).

B. Preparation of 4% NaOH:

Adding 40 grams of NaOH slowly, let it dissolve in 960 grams of Mill-QH$_2$O.

C. Preparation of 0.1N HCl standard solution:
1. Pipet 8.3 mL of HCl (G.R grade; S.G 1.2 (37.5%)).
2. Pour it to a 100 mL volumetric flask, fill to the mark with D.M.W.
3. Shake above solution ,then remove it to a glass battle D. Standardization:
Standardize the concentration of HCl by the standard of Na$_2$CO$_3$.
Na$_2$CO$_3$+2HCl→2NaCl+CO$_2$+H$_2$O 1. Reagents: G.R grade of Na$_2$CO$_3$ and methyl-orange indicator.
2. Standardization procedure:
   a). Accurately weigh two of 0.15~0.2 grams of Na$_2$CO$_3$ to oven at 270° C.~280 ° C. keep 1 hours.
   b). Respectively remove above solutions into 250 mL of beakers.
   c). Add 100 mL of D.M.W into the beakers, heat and dissolve these.
   d). Add 3 drops of methyl-orange indicator.
   e). Fill the buret with the solution of HCl and NaOH.
   f). Titrate each solution with HCl and NaOH until the color of indicator begins to change, it is the end-point. If titrate over end-point, put it on a asbestos net to heat at the temperature of boil point keep one minute. Cool the solution in cooling water, then to against titrate let the color of indicator change to original color again.

3. Calculation:

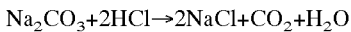

Where: W=the weight (g) of Na$_2$CO$_3$
V=volume (mL) of HCl

E). Measurement of concentration of 4% NaOH:
1. Weigh 3 grams (W g) of sample and place it into a 250 mL of glass bottles.
2. Add 100 mL of D.M.W.
3. Add 5 drops of pHenolpHthalein indicator.
4. Titrate with 0.1 N of HCl, until transfer the color from pink to colorless.
5. Record the requirement (V mL) of HCl.

$$\text{NaOH (\%)} = \frac{N \times V \text{ mL} \times 40 \times 1/1000 \times 100}{Wg}$$
$$= \frac{4 \times N \times V \text{ mL}}{Wg}$$

Where: N=the concentration of HCl
V=volume (mL) of HCl

This invention will be further illustrated by the following examples, but it should be construed that the present invention is in no way limited to those examples.

In this invention we use 2 mL/min 4% NaOH to regenerate different composition resin just as shown in sheet. 1. The regeneration dosages of weakly basic anion resin and strongly basic anion resin are 50 g/L-R 99.95% NaOH and 62.5 g/L-R 99.95% NaOH, respectively.

This invention bases on removing formic acid from process water through regenerated resin. When conductivity increasing and pH value descending indicate formic acid break-through, treating end point, then we shall regenerate it.

Experiment 1

Sample 200 ppm formic acid process water and make it flow through regenerated strata bed resin, weakly basic anion resin 35 mL (70%) and strongly basic anion resin 15 mL (30%) separated by baffle, to remove formic acid. When conductivity reaches 2.04 μΩ/cm, the total treated process water is 11250 mL, the adsorption capacity is 45 g/L-R. The de-acid efficiency is 78.3%. (The experiment result shown in sheet 1)

Experiment 2

Sample 110 ppm formic acid process water and make it flow through regenerated strata bed resin, weak base anion resin 35 mL (70%) and strongly basic anion resin 15 mL (30%) separated by baffle, to remove formic acid. When conductivity reaches 2.10 μΩ/cm, the total treated process water is 19325 mL, the adsorption capacity is 42.5 g/L-R. The de-acid efficiency is 73.9%. (The experiment result shown in sheet 1)

Experiment 3

Sample 50 ppm formic acid process water and make it flow through regenerated strated bed resin, weakly basic anion resin 35 mL (70%) and strongly basic anion resin 15 mL (30%) separated by baffle, to remove formic acid. When conductivity reaches 1.20 μΩ/cm, the total treated process water is 36150 mL, the adsorption capacity is 36.1 g/L-R. The de-acid efficiency is 63%. (The experiment result shown in sheet 1)

Experiment 4

Sample 25 ppm formic acid process water and make it flow through regenerated strated bed resin, weakly basic anion resin 35 mL (70%) and strongly basic anion resin 15 mL (30%) separated by baffle, to remove formic acid. When conductivity reaches 1.78 $\mu\Omega$/cm, the total treated process water is 59260 mL, the adsorption capacity is 29.6 g/L-R. The de-acid efficiency is 51.5%. (The experiment result shown in sheet1)

Experiment 5

Sample 50 ppm formic acid process water and make it flow through regenerated series bed resin, weakly basic anion resin 35 mL (70%) and strongly basic anion resin 15 mL (30%) separated by vessel, to remove formic acid. When conductivity reaches 1.20 $\mu\Omega$/cm, the total treated process water is 36150 mL, the adsorption capacity is 36.1 g/L-R. The de-acid efficiency is 63%. (The experiment result shown in sheet 1)

Experiment 6

Sample 50 ppm formic acid process water and make it flow through regenerated series bed resin, weakly basic anion resin 35 mL (70%) and strongly basic anion resin 15 mL (30%) separated by vessel, to remove formic acid. When conductivity reaches 1.78 $\mu\Omega$/cm, the total treated process water is 59260 mL, the adsorption capacity is 29.6 g/L-R. The de-acid efficiency is 51.5%. (The experiment result shown in sheet 1)

Reference Experiments 1~6

(1) Sample process water containing same formic acid concentrations as Experiments 1~4 cases and make it flow through regenerated single weakly basic anion resin vessel to remove formic acid. The de-acid efficiencies are 49.6%, 46.9%, 36.2% and 24.9% respectively, the average de-acid efficiency is 39.4%. Sheet.2 shows the de-acid efficiencies of Experiments 1~4 and Reference Experiments 1~4.

(2) Sample process water containing same formic acid concentrations as Experiments 1~4 cases and make it flow through regenerated strated bed resin vessel to remove formic acid. The de-acid efficiencies are 78.3%, 73.9%, 63.0% and 51.5% respectively, the average de-acid efficiency is 66.67%. Sheet.2 shows the de-acid efficiencies of Experiments 1~4 and Reference Experiments 1~4.

(3) Sample process water containing same formic acid concentrations as Experiments 5~6 cases and make it flow through regenerated series bed resin vessels to remove formic acid. The de-acid efficiencies are 63% and 51.5% respectively. The de-acid efficiencies are same as Experiments 5~6 cases.

(4) The de-acid efficiency of strated bed resin is increased 69% compared with single weak base resin case.

A: the average de-acid efficiency of strata bed resin (66.67%)

B: the average de-acid efficiency of single weakly basic anion resin (39.4%)

The de-acid efficiency increasing rate is:

$$(A - B)/B \times 100\% = (66.67\% - 39.4\%)/39.4\% \times 100\%$$

$$= 69.2\%$$

From sheet 1 and FIG. 3, we can see that adapting strata bed to remove formic acid and acetic acid is clearly more effective than single weak base anion exchange resin, the efficiency is increased 69% from experiment result. So for low formic acid and acetic acid concentration manufacture process, using strata bed resin can effectively remove them and gain cost-down benefit.

Sheet. 1 formic acid and acetic acid removing efficiencies of Experiments 1~6

| | Formic acid Conc. (ppm) | pH | Removing method | Resin quality (mL) | Regen. dosage g/L-R NaOH | Regen. Conc. % NaOH | End point pH | End point Conductivity $\mu\mho$/cm | Practice adsorption capacity (g/L-R) | Theoretic adsorption capacity (g/L-R) | Practice De-acid efficiency (%) |
|---|---|---|---|---|---|---|---|---|---|---|---|
| Experiment 1 | 200 | 3.26 | Weak base anion resin | 50 | 50 | 4 | 4.64 | 2.43 | 28.5 | 57.5 | 49.6 |
| | | | Strated-bed | 50 | 50 | 4 | 5.63 | 2.04 | 45 | 57.5 | 78.3 |
| Experiment 2 | 110 | 3.41 | Weak base anion resin | 50 | 50 | 4 | 4.81 | 1.81 | 27 | 57.5 | 46.9 |
| | | | Strated-bed | 50 | 50 | 4 | 5.43 | 2.1 | 42.5 | 57.5 | 73.9 |
| Experiment 3 | 50 | 3.57 | Weak base anion resin | 50 | 50 | 4 | 4.72 | 2.86 | 20.8 | 57.5 | 36.2 |
| | | | Strated-bed | 50 | 50 | 4 | 4.42 | 1.2 | 36.1 | 57.5 | 63 |
| Experiment 4 | 25 | 3.69 | Weak base anion resin | 50 | 50 | 4 | 5.08 | 1.35 | 14.3 | 57.5 | 24.9 |
| | | | Strated-bed | 50 | 50 | 4 | 4.65 | 1.78 | 29.6 | 57.5 | 51.5 |
| Experiment 5 | 50 | 3.57 | Series treatment | 50 | 50 | 4 | 4.42 | 1.2 | 36.1 | 57.5 | 63 |
| Experiment 6 | 25 | 3.69 | Series treatment | 50 | 50 | 4 | 4.65 | 1.78 | 29.6 | 57.5 | 51.5 |

I claim:

1. A method for removing formic acid and acetic acid from processed water produced in the manufacturing of ethylene glycol, wherein said method comprises:

(A) passing said processed water through weakly basic anion resin; and then (B) passing processed water from step (A) through strongly basic anion resin.

2. The method of claim 1 wherein the weakly basic anion resin and the strongly basic anion resin are in strata arrangement in a vessel.

3. The method of claim 1 wherein the weakly basic anion resin and the strongly basic anion resin are in the different vessels in series.

* * * * *